United States Patent [19]
Johnson et al.

[11] Patent Number: 5,664,097
[45] Date of Patent: Sep. 2, 1997

[54] SYSTEM FOR DELAYING THE ACTIVATION OF INACTIVITY SECURITY MECHANISMS BY ALLOWING AN ALTERNATE INPUT OF A MULTIMEDIA DATA PROCESSING SYSTEM

[75] Inventors: William J. Johnson, Flower Mound; Michael D. Smith, Euless; Marvin L. Williams, Lewisville, all of Tex.

[73] Assignee: International Business Machines Corporation, Armonk, N.Y.

[21] Appl. No.: 814,337

[22] Filed: Dec. 26, 1991

[51] Int. Cl.$^6$ .................................................. H04K 1/00
[52] U.S. Cl. ............................ 395/186; 395/188.01; 380/4; 380/25
[58] Field of Search .......................... 395/575, 500, 395/750, 186, 188.01; 380/4, 25; 371/60, 61, 62

[56] References Cited

U.S. PATENT DOCUMENTS

| | | | |
|---|---|---|---|
| 3,781,874 | 12/1973 | Jennings | 341/26 |
| 4,558,175 | 12/1985 | Genest et al. | 178/22.08 |
| 4,727,476 | 2/1988 | Rouchon | 395/500 |
| 4,812,841 | 3/1989 | Chen | 340/825.31 |
| 4,937,778 | 6/1990 | Wolf et al. | 340/711 |
| 4,942,606 | 7/1990 | Kaiser et al. | 380/4 |
| 4,951,249 | 8/1990 | McClung et al. | 380/4 |
| 5,034,598 | 7/1991 | Poland | 235/425 |
| 5,083,266 | 1/1992 | Watanabe | 395/275 |
| 5,097,506 | 3/1992 | Kaiser, Jr. et al. | 380/25 |
| 5,136,644 | 8/1992 | Audebert et al. | 380/25 |
| 5,173,940 | 12/1992 | Lantz et al. | 380/25 |
| 5,214,421 | 5/1993 | Vernon et al. | 340/825.03 |

*Primary Examiner*—Krisna Lim
*Attorney, Agent, or Firm*—Geoffrey A. Mantooth

[57] ABSTRACT

A data processing system has a security mechanism to lock up a secured input device, such as a keyboard, after the secured input device has been inactive or unused after a predetermined event, such as the expiration of a period of time, has occurred. Multimedia input devices are used to provide alternatives to the secured input device. Activation of the security mechanism is delayed when using an alternate or multimedia input device by providing an emulating input to the security mechanism. The emulating input simulates an input produced by the secured input device. The emulating input is produced before the predetermined event occurs if the alternate input device has produced an input. Furthermore, some alternate input devices, such as voice recognition systems, have general input properties and provide non-user inputs, such as background noise. Therefore, user inputs are distinguished from non-user inputs so that non-user inputs do not delay activation of the security mechanism.

2 Claims, 4 Drawing Sheets

SYSTEM FOR DELAYING THE ACTIVATION OF INACTIVITY SECURITY MECHANISMS BY ALLOWING AN ALTERNATE INPUT OF A MULTIMEDIA DATA PROCESSING SYSTEM

FIELD OF THE INVENTION

The present invention relates to security mechanisms that prevent a user from accessing a data processing system through a particular user interface due to inactivity on the user interface.

BACKGROUND OF THE INVENTION

In a data processing system, user interfaces provide the way that users access the data processing system. A user interface typically includes, among other things, a keyboard and a display.

User interfaces are commonly fitted with security mechanisms to prevent unauthorized entry into the data processing system. This is particularly true in office environments where many people can easily access a user interface. One type of security mechanism locks or disables the keyboard after the keyboard has been inactive for a specified period of time. The security mechanism assumes that if the user has not engaged in any keyboard activity for some time, for example, fifteen minutes, then the user may have gotten up and walked away from the keyboard. So, after fifteen minutes has passed, the keyboard is locked to prevent any unauthorized entries or inputs by passersby at the unattended keyboard. With some type of systems, the display even goes blank to prevent sensitive information from being displayed to curious eyes. Once the keyboard locks, the user can unlock it by entering his password. This allows reentry into the data processing system through that particular user interface.

A problem with the prior art security mechanisms is that in multimedia systems the keyboard can be bypassed as an input device. The keyboard is a clumsy input device. One goal in making computers more "user friendly" is to eliminate the keyboard entirely as an input device. Therefore, voice recognition systems and touch screen systems are being employed as alternative input devices to keyboards. Voice recognition systems allow application programs to be controlled entirely by voice commands, while touch screen systems allow a user to touch icons on display screens to input commands.

Use of these non-keyboard input devices in conjunction with prior art security mechanisms causes problems because the security mechanisms do not recognize inputs from the non-keyboard devices. With a voice recognition system, for example, the user can be speaking to the user interface when suddenly the user interface is locked up by the keyboard security mechanism. Lockup occurs because the keyboard security mechanism does not recognize input from the voice recognition system. When lockup occurs, no further voice commands are accepted and the display goes blank. To prevent lockup when using the voice recognition system, the user must either remember to use the keyboard periodically, or more typically, endure the periodic lockups and reenter the data processing system when necessary. Either way, the user's concentration is interrupted, resulting in frustration and inefficiencies.

Another problem caused by the use of non-keyboard input devices in conjunction with prior art security mechanisms is the difficulty of distinguishing between a user input and a non-user input. Due to its general input properties, a voice recognition system will pick up background noise. This background noise might be accidently interpreted as a user input by the security mechanism. Such an interpretation thwarts the function of the security mechanism.

SUMMARY OF THE INVENTION

It is an object of the present invention to provide a method and system for integrating multimedia input devices into inactivity security mechanisms for a data processing system user interface.

It is another object of the present invention to provide a method and system for distinguishing between a user input and a non-user input for the purpose of integrating multimedia input devices into inactivity security mechanisms for a data processing system user interface.

The present invention is used in a data processing system having a user interface. The user interface has respective first and second input means for providing respective first and second inputs to the data processing system. The data processing system has means for securing the user interface such that after a predetermined event has occurred without the first input from the first input means occurring, the securing means secures the first input means to prevent further information from being input by the first input means. The present invention delays the securing means from securing the first input means. The present invention determines if, in the absence of the first input from the first input means, the second input means provides the second input before the occurrence of the predetermined event. An emulating input is provided if the second input means has provided the second input before the occurrence of the predetermined event. The emulating input simulates the first input from the first input means.

The present invention allows an alternate input device (such as a voice recognition device) to be used with a secured input device (such as a keyboard) having a security mechanism that recognizes inputs from the secured input device. The present invention causes an input from the alternate input device to emulate an input from the secured input device so that the security mechanism is deceived into accepting an input from the alternate input device. The security mechanism thus delays locking up the user interface.

Because of the general input properties of some input devices, such as voice recognition systems, non-user types of inputs (such as background noise) can be generated. The present invention determines if the input is a user input or a non-user input. If the input is of the non-user type, then it is ignored. If the input is user provided, then it is used to delay the activation of the security mechanism.

BRIEF DESCRIPTION OF THE DRAWINGS

FIG. 3 shows the registration process for registering input devices. FIG. 4 shows the monitor process that determines if an input is a user input from a registered input device. FIG. 5 shows the activator process for emulating an input from a keyboard in order to prevent the activation of the security mechanism.

DESCRIPTION OF PREFERRED EMBODIMENT

Figure 1:
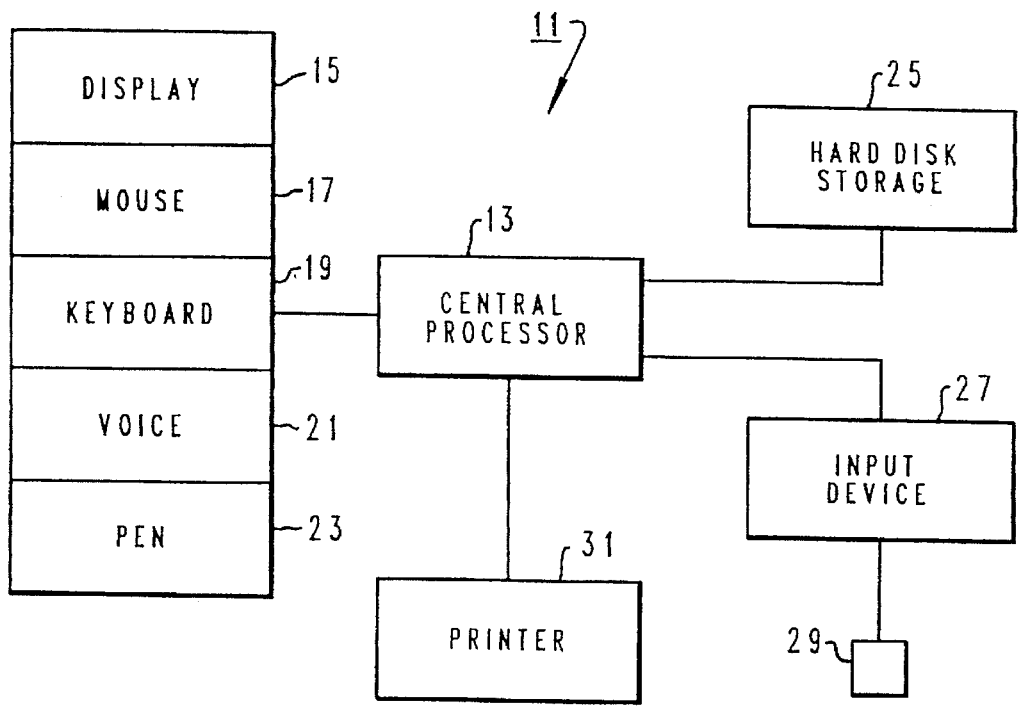
FIG. 1 is a block diagram showing the data processing system of the present invention, in accordance with a preferred embodiment.

In FIG. 1, there is shown a data processing system 11 of the present invention. The system 11 has a central processor 13 which has memory located therein. A user interface is connected to the processor 13. The user interface includes an output device in the form of a display 15 and input devices in the form of a mouse 17, a keyboard 19, a voice input device 21 and a pen tablet 23. All of the input and output devices are connected to the processor 13. A memory device in the form of a hard disk storage device 25 is connected to the processor. An input media device 27 is also connected to the processor 13. The input media device 27 receives a disk 29 or other type of computer readable medium. The disk 29 has computer program logic recorded thereon, which logic implements the present invention. There is also provided a printer 31 connected with the processor 13.

Figure 2:
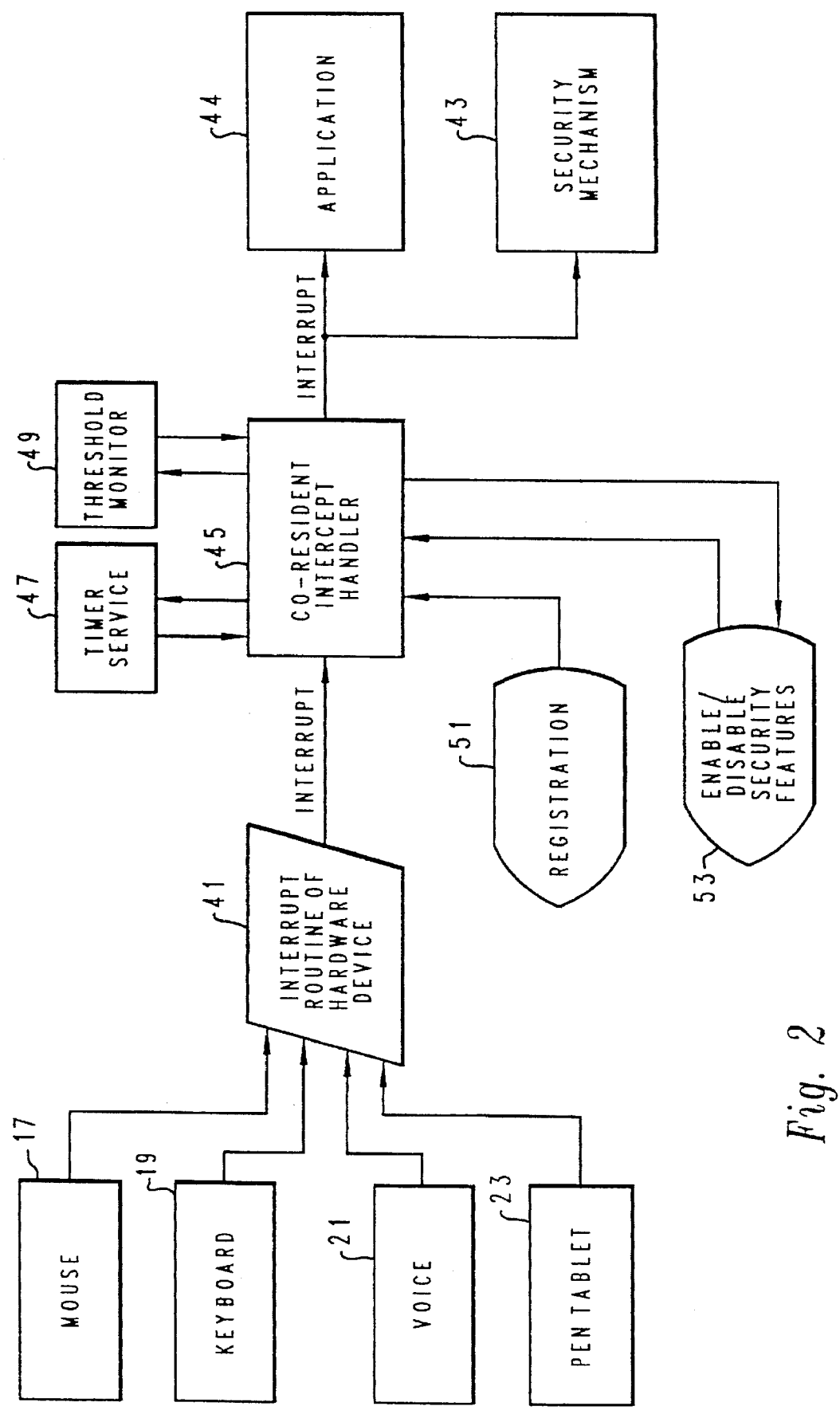
FIG. 2 is a component flow diagram of the present invention.

In FIG. 2, there is shown a component flow diagram of the various hardware and software components of the present invention. The software components reside in the data processing system. All of the input devices 17, 19, 21, 23 are connected so as to send their respective interrupts to an interrupt routine 41. The interrupt routine 41 is associated with one of the input devices, typically the keyboard 19. The output of the interrupt routine 41 communicates with a security mechanism 43 through a co-resident intercept handler 45. The security mechanism 43 is a program that is executed on the data processing system 11. The co-resident intercept handler 45 is co-resident in memory with the security mechanism 43. The security mechanism 43 typically looks for interrupts from the secured input device (such as the keyboard 19). If a secured input device interrupt is not received within a predetermined period of time, the security mechanism locks the secured input devices and the other input devices. In addition, the co-resident intercept handler 45 communicates with whatever application program 44 or programs are being executed. A timer service 47 bidirectionally communicates with the co-resident intercept handler 45. A threshold monitor 49 also bidirectionally communicates with the co-resident intercept handler 45. The timer service 47 is the clock of the data processing system 11. The threshold monitor 49 is used to distinguish a user input from the non-user input. Two user interfaces are provided. A registration interface 51 communicates with the co-resident intercept handler 45. An enable/disable interface 53 bidirectionally communicates with the co-resident intercept handler 45. The interface 53 is used to enable and disable the co-resident interrupt service.

The method of the present invention will now be described with reference to the flow charts of FIGS. 3–5. In the flow charts, the following graphical conventions are observed: a diamond for a test or decision and a rectangle for a process or function. These conventions are well understood by those skilled in the art, and the flow charts are sufficient to enable one skilled in the art to write code in any suitable computer programming language, such as BASIC, PASCAL or C for a computer such as the IBM Personal System/2 (PS/2) family of computers which supports these languages.

When the user installs at his user interface an alternate input device that is not a device that the security mechanism 43 is sensitive to, he must register that alternate input device. Registration allows input interrupts from the device to be identified as such, thus providing for the continued disabling of the security mechanism. Registration occurs through the registration interface 51.

Figure 3:
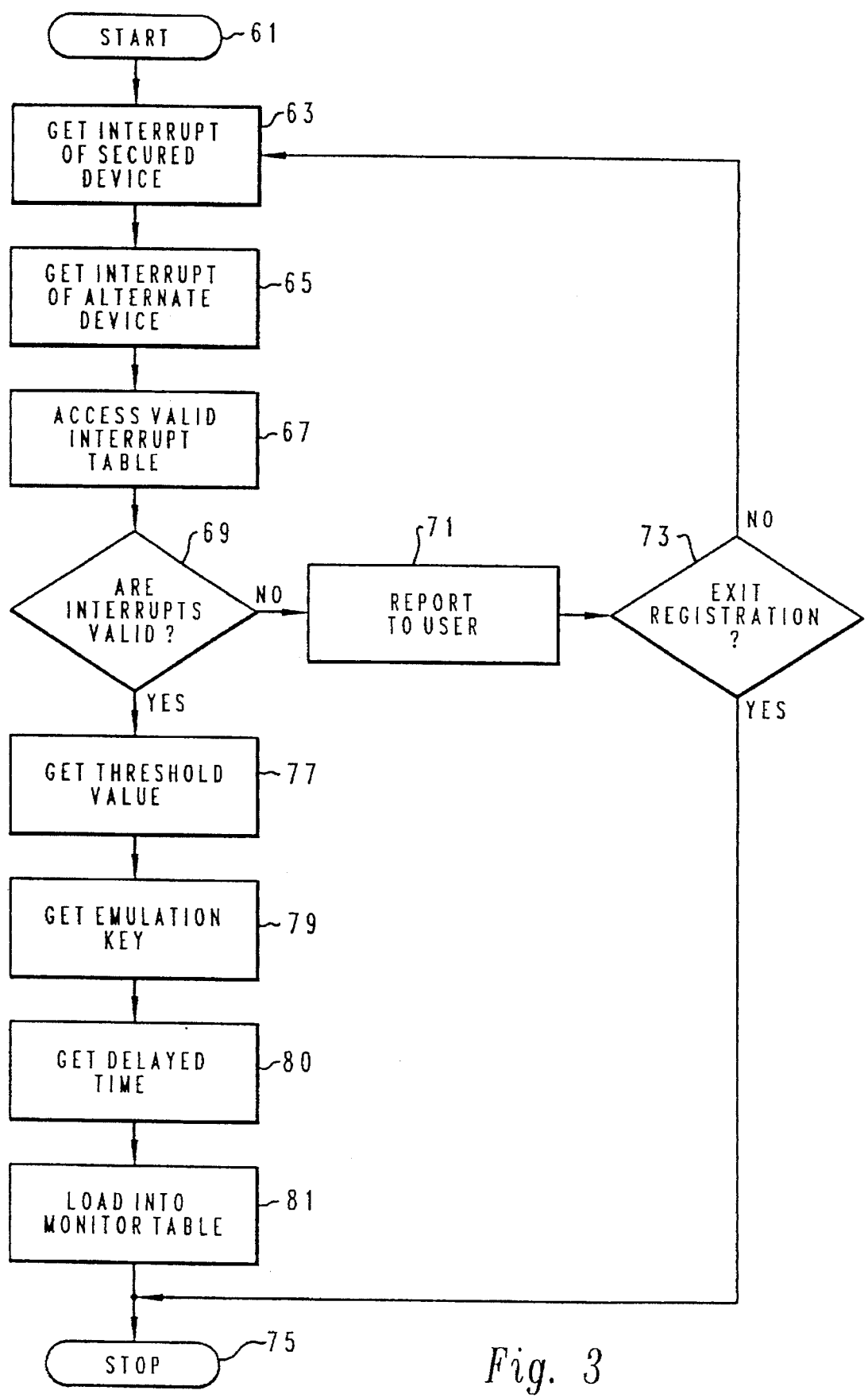

The registration process is shown in FIG. 3. The registration process is started and initialized, step 61, when a user seeks to register an input device. In the first step 63, the process gets the interrupt of the secured input device. In the discussion that follows, the keyboard 19 will be used as an example of the secured input device and the voice input device 21 will be used as an example of the alternate input device. This step identifies which channel the keyboard interrupt is operating on. The next step 65 gets the interrupt of the voice input device 21 which is being registered. In steps 67 and 69, the two interrupts are checked for validity and accuracy. In step 67, a valid interrupt table is accessed. In step 69, the determination is made if interrupts are valid by comparing the interrupts against the valid interrupt table. If NO, the interrupts are not valid, the method proceeds to step 71, where the error is reported to the user. Then, the determination is made if the registration process is exited, step 73. If NO, then the method loops back to step 63 to try again. If YES, then the method stops, step 75.

If the result of step 69 is YES, the interrupts are valid, then the method gets the threshold value, step 77. Typically, this is user supplied. The threshold value is used to decide if an input on the voice input device 21 is a user input or a non-user input (such as background noise on a voice recognition device). One way to express the threshold value is by a confidence factor. For example, the audio input of the voice input device 21 would be compared to recognizable, stored samples of valid user inputs. The confidence factor is a percentage, indicating the percent confidence that an input is a user input. Different input devices can have different threshold values.

The next step 79 involves getting an emulation key or code from the application program 44. The emulation key is a "safe" key on the keyboard 19 that has no effect on the application program. For example, an emulation key might be the "ALT" key. This emulation key is assigned to the particular input device being registered. Next, the method gets the delayed time, step 80. The delayed time determines when the method will delay the security mechanism by providing an input that is acceptable to the security mechanism. It is only necessary to delay the security mechanism when the time limit on the security mechanism is about to expire. However, the user can select a shorter delayed time to ensure that the security mechanism will be delayed. The threshold value, the emulation key and the delayed time are loaded into a monitor table, step 81. The registration process then stops, step 75.

Figure 6:
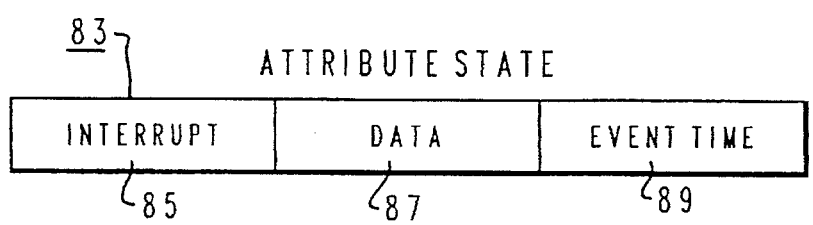
FIG. 6 illustrates the elements in an attribute state.

When an input device produces an interrupt input to input data into the application program 44 (see FIG. 2), that interrupt input is intercepted by the co-resident intercept handler 45. The co-resident intercept handler 45 has a piece of memory referred to as an attribute state 83 (see FIG. 6). The attribute state 83 has three elements therein, namely an interrupt input 85 from an input device, a data input 87 produced by the input device and the time 89 that the input event occurred.

Figure 4:
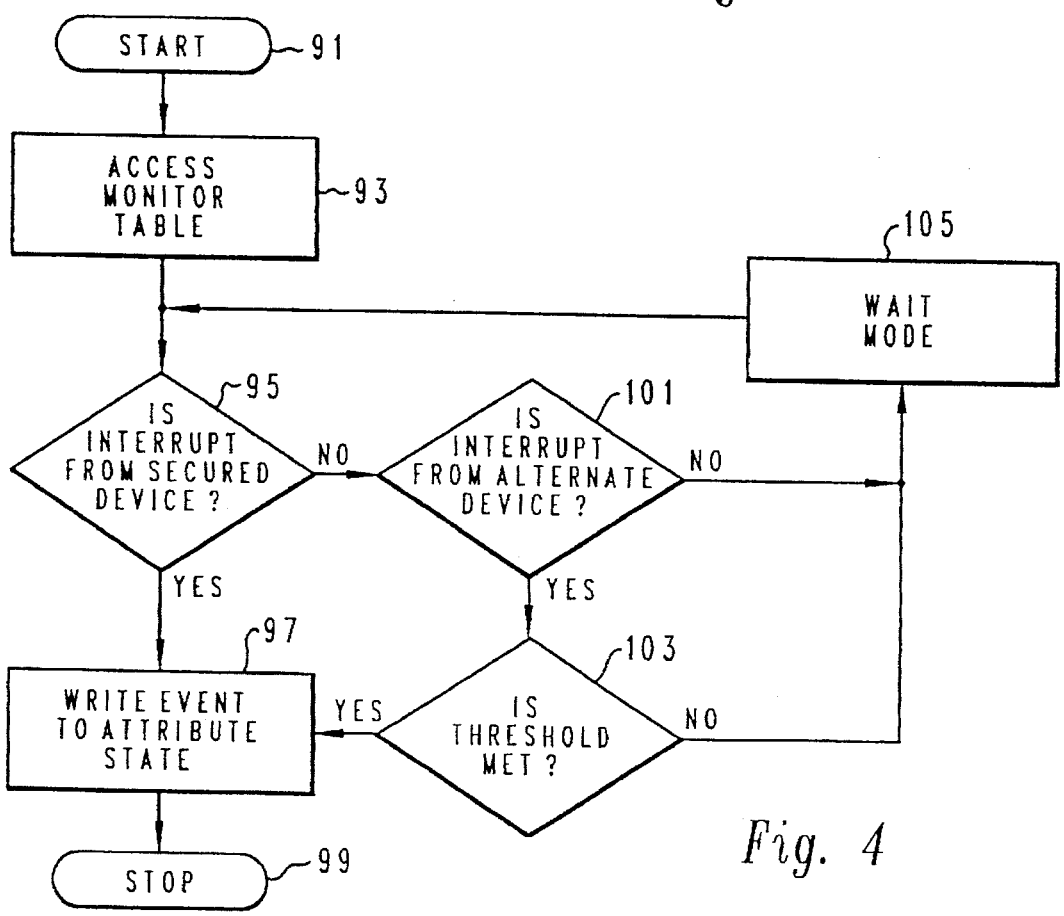
FIGS. 3, 4 and 5 are flow charts showing the method of the present invention, in accordance with a preferred embodiment.

The monitor process of FIG. 4 processes interrupt inputs of input devices to determine if they are valid user interrupts. The monitor process begins when an input device interrupt is received. Alternatively, the monitor process can be used to periodically poll for interrupts. The monitor process determines if a secured input device (such as the keyboard 19) or an alternate input device (such as the voice input 21) has produced the interrupt input. If the secured input device produced the interrupt input, then the event of the occurrence of the interrupt input is written to the attribute state 83. If the alternate input device produced the interrupt input, the data input is evaluated to determine if a user produced the data input. If the data input is user produced, then the event of the occurrence of the interrupt and data inputs is written to the attribute state.

After the monitor process is started and initialized, step 91, the monitor table is accessed, step 93. Then the method determines if the interrupt is from the keyboard 19, which is the secured input device, step 95. If YES, then the method proceeds to step 97 where the event is written to the attribute state (see FIG. 6). This involves writing the keyboard interrupt input, the data input and the event time to the attribute state 83. Then, the method stops, step 99.

If the result of step 95 is NO, then the method proceeds to step 101 to determine if the interrupt input is from the voice input device 21, which is the alternate input device. If YES, then the method proceeds to step 103 to determine if the threshold is met. The threshold monitor 49 determines if the data input is a valid user input, by comparing the data input to the threshold value. If the result of step 103 is YES, the threshold is met, then the next step is step 97 where the voice input device interrupt input, data input and event time are written to the attribute state 83.

If the result of either step 101 or 103 is NO, then the method goes in to a wait mode, step 105. The method enters the wait mode either when an interrupt input is not from a registered input device or when a data input has not been qualified as a user input. In the wait mode, the method waits for an interrupt input. When an interrupt input is detected, either by receipt or by polling, then step 95 is repeated.

Figure 5:
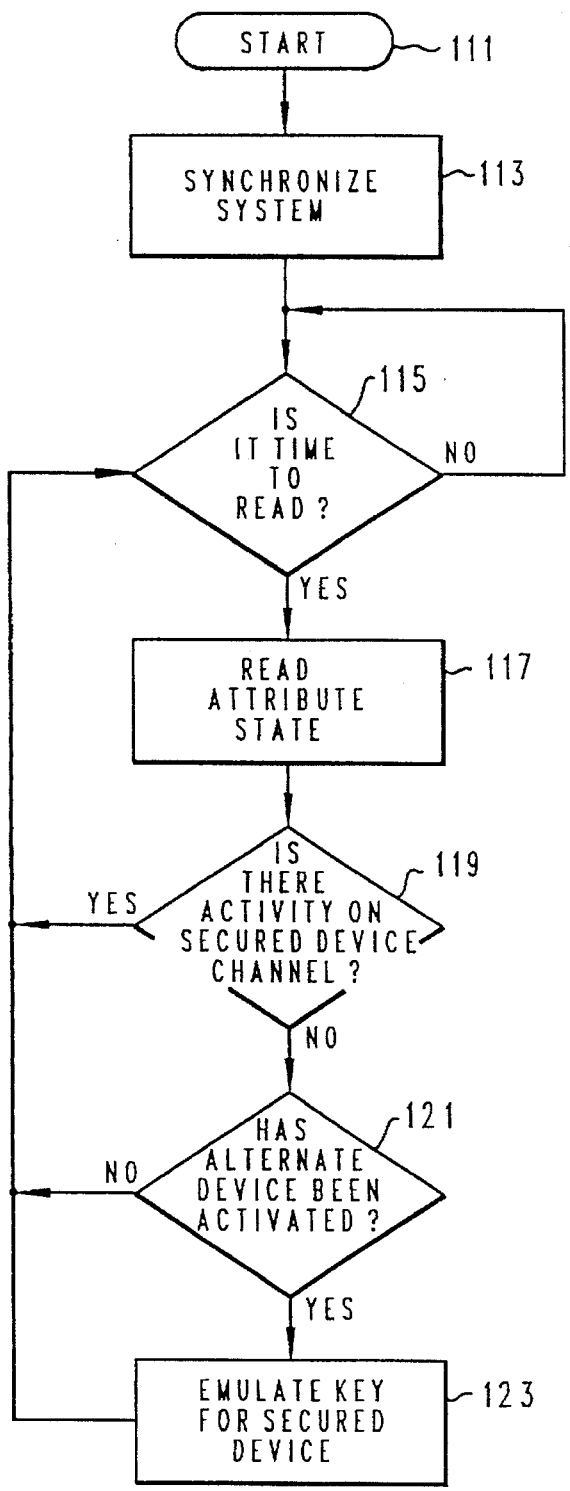

Referring now to FIG. 5, the activator process will be described. The activator process reads the attribute state 83 to determine if the activation of the security mechanism 93 should be delayed. If the attribute state 83 contains an event, then the activator process produces an emulating input that is acceptable to the security mechanism, wherein the lockup of the input devices is avoided. This emulating input emulates an input from the keyboard.

The activator process is started and initialized, step 111. Then, the process synchronizes itself with the clock on the data processing system, step 113. This synchronizes the activator process with the security mechanism 43 so that the activator process can accurately predict the length of the expiration time. The synchronization step 113 can occur through user calibration. For example, the user could press ENTER on the keyboard, wherein an interrupt would be produced to restart the predetermined period of time used by the security mechanism. Next, the method determines if it is time to read the attribute state, step 115. The co-resident intercept handler 45 acquires this time to read information from the timer service 47. The time to read is determined by the delayed time registered by the user in step 80, FIG. 3. If the result of step 115 is NO, then the method loops back to step 115. If YES, then the method proceeds to step 117 where the attribute state 83 is read. Next, in step 119, the method determines from the attribute state 83, if there is activity on the keyboard 19, FIG. 2, or secured input device, channel. If YES, the keyboard 19 has produced an interrupt input, then the method loops back to step 115, because the keyboard itself has delayed the activation of the security mechanism. If NO, the keyboard has not produced an interrupt input, then the method proceeds to step 121, where it determines, from the attribute state 83, if the voice input device 21 has been activated. If the result of step 121 is NO, then the method loops back to step 115 for a re-reading of the attribute state 83 to check if any registered input device has been activated or used since the last reading. If YES, then the method proceeds to step 123, where an emulation input is produced and sent to the security mechanism 43. The emulation input, which uses the emulation key, emulates an input from the secured input device, and thus prevents the security mechanism from locking the input devices 17, 19, 21, 23. Then, the method loops back to step 115 to again await reading the attribute state.

An advantage of the present invention is that it can be retrofitted into existing security mechanism systems. The co-resident intercept handler 45 of FIG. 2 is interposed between the interrupt routine 41 and the security mechanism 43, so as to intercept inputs before they reach the security mechanism. By intercepting the inputs of the alternate devices, the co-resident intercept handler can produce an emulating input.

Although the present invention has been described in conjunction with the occurrence of a particular predetermined event, namely the expiration of a period of time during which a particular input device has been inactive, the present invention can be used in conjunction with other types of predetermined events. For example, an external event (external to the data processing system) can be used as criteria for activating the security mechanism. An example of such an external event includes when a user's telephone is not answered. Without the present invention, failure to answer the user's telephone would result in the security mechanism being activated. However, with the present invention, input from an alternate device would delay the activation of the security mechanism even if the user's telephone was not answered. In addition, an event, whether internal or external, could be defined as inactivity for the purpose of activating the security mechanism, or activity for the purpose of delaying the activation of the security mechanism. An example of an event that could be defined either as inactivity or activity would be the use of shared memory.

The predetermined event could be defined over the entire data processing system, or it could be defined for a single user interface.

Although the present invention has been described with external input devices, internal processes and applications could be used as well. Applications which emulate external devices can benefit from the present invention.

The foregoing disclosure and the showings made in the drawings are merely illustrative of the principles of this invention and are not to be interpreted in a limiting sense.

We claim:

1. A method of delaying the activation of a means for securing a user interface on a data processing system, said user interface comprising first input means for providing a first input into said data processing system and second input means for providing a second input into said data processing system, said means for securing said user interface securing said user interface if said first input has not occurred after the occurrence of an event, said second input from said second input means comprises a user data input and a non-user data input, comprising the steps of:

a) determining if said first input has occurred before the occurrence of said event;
b) if said first input has not occurred before the occurrence of said event, then determining if said second input has occurred before the occurrence of said event;
c) determining if said second input is said user data input; and
d) providing an emulating input to said means for securing said user interface if said second input has occurred before the occurrence of said event and only if said second input is said user data input, wherein said emulating input emulates said first input and delays said means for securing said user interface from securing said user interface.

2. The method of claim 1 wherein said step of determining if said second input is said user data input further comprises the step of comparing said second input to a reference user data input.

* * * * *